Sept. 29, 1925.
J. PETERSON
VEHICLE WASHER
Filed March 8, 1924
1,555,754
3 Sheets-Sheet 2
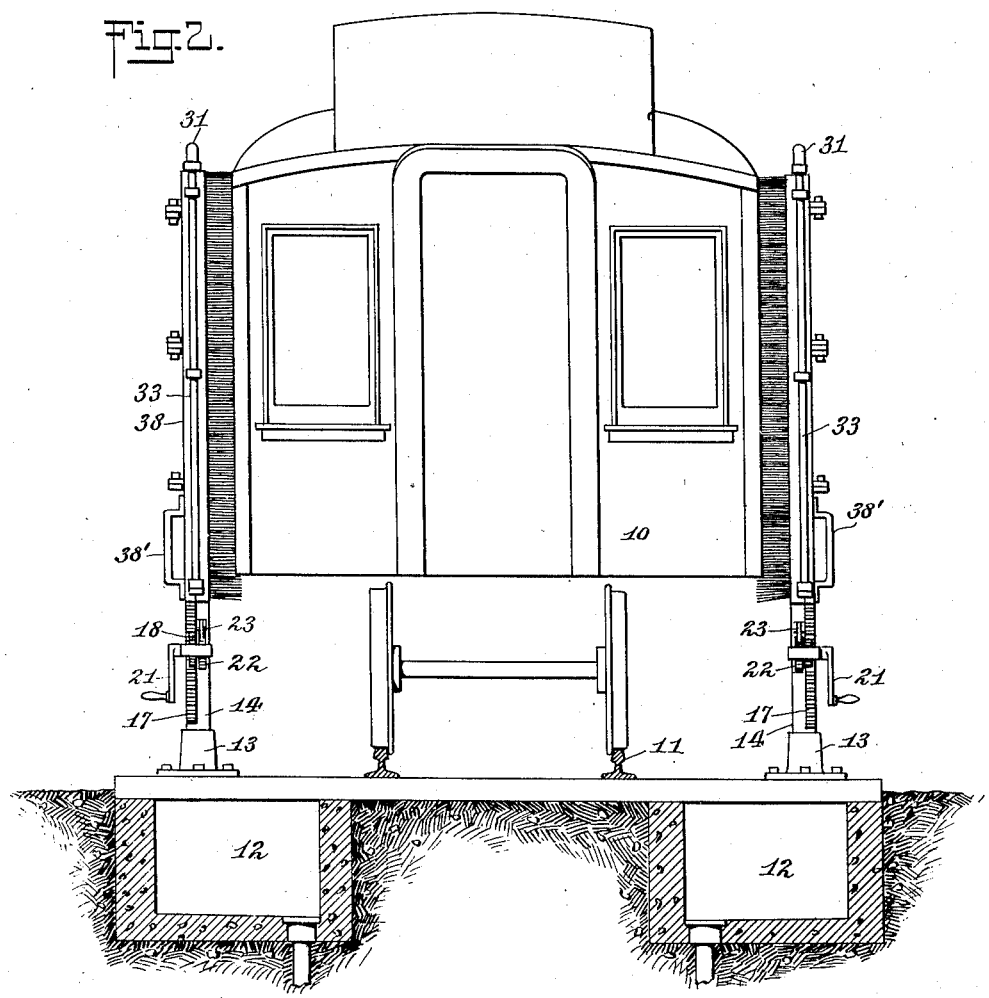
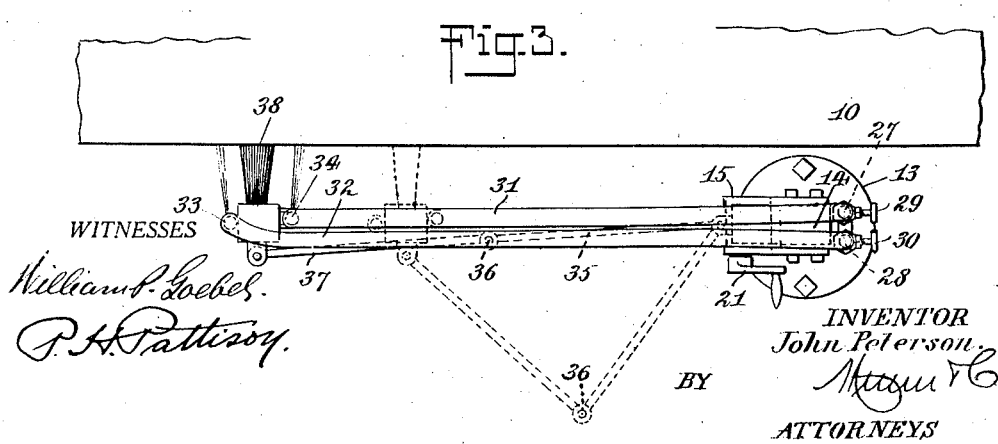

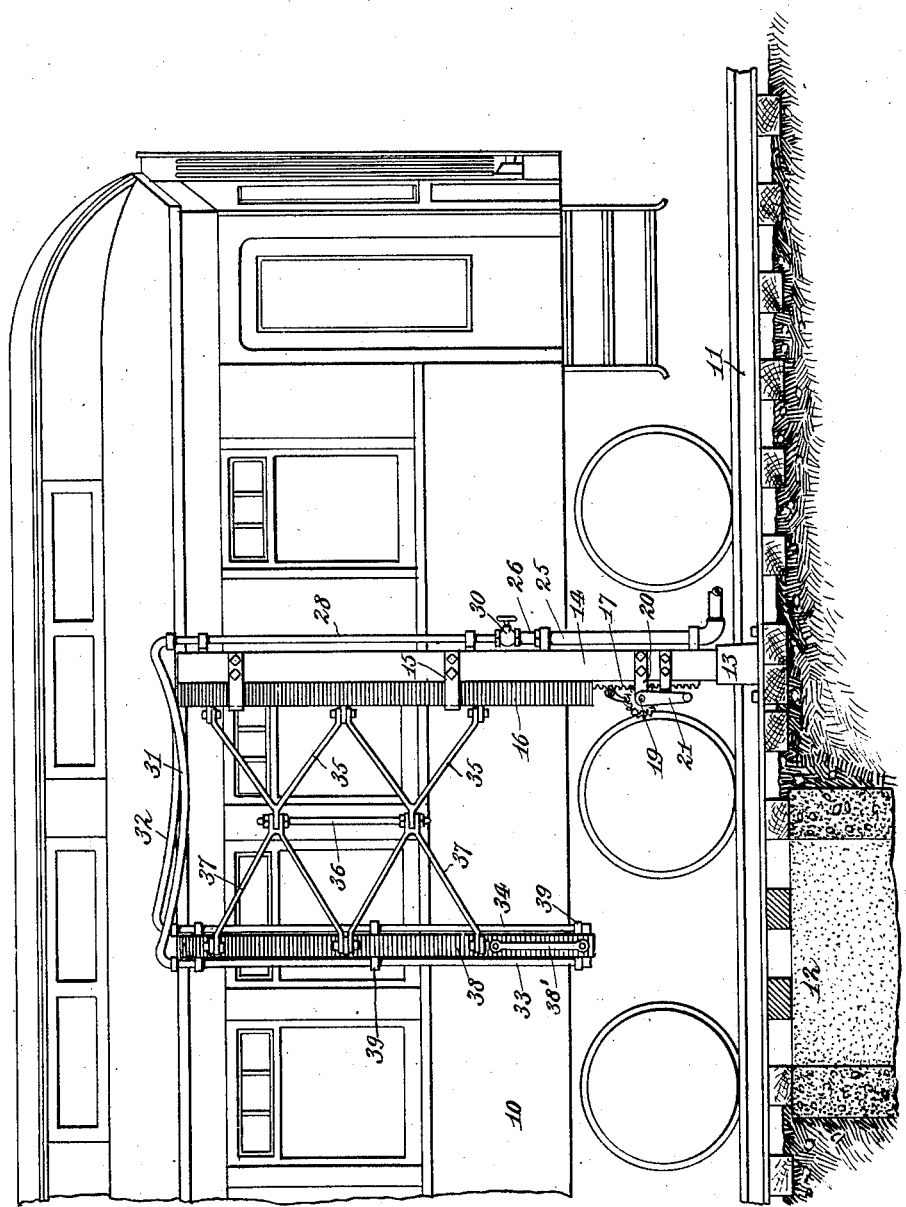

Sept. 29, 1925.
J. PETERSON
VEHICLE WASHER
Filed March 8, 1924
1,555,754
3 Sheets-Sheet 3
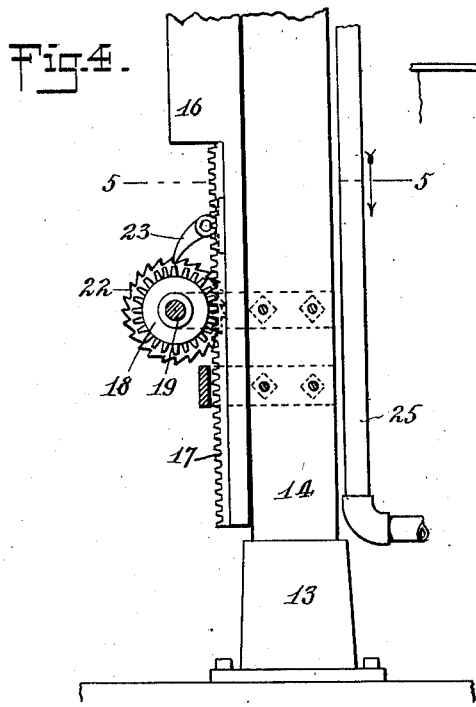
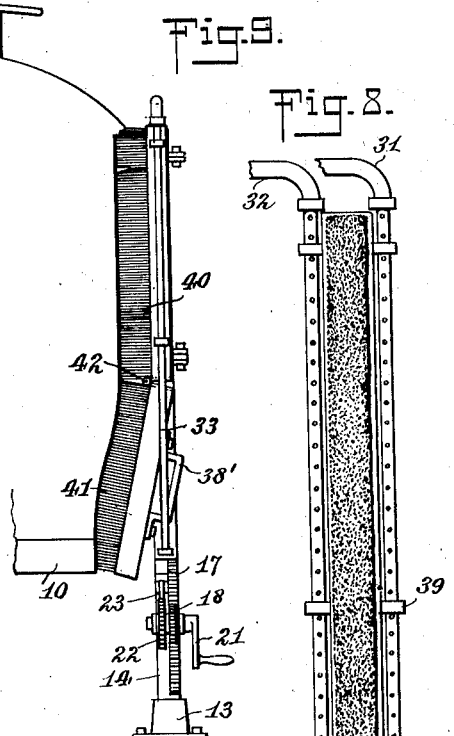
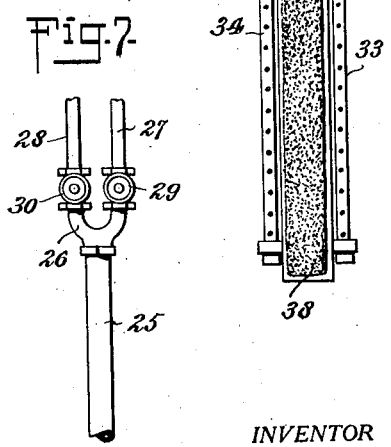
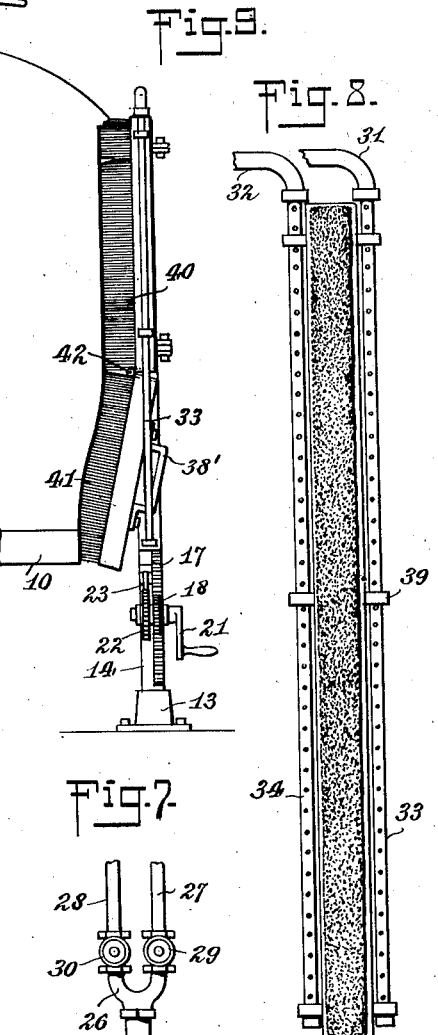
WITNESSES
INVENTOR
John Peterson.
BY
ATTORNEYS Patented Sept. 29, 1925.

1,555,754

UNITED STATES PATENT OFFICE.

JOHN PETERSON, OF NEW YORK, N. Y.

VEHICLE WASHER.

Application filed March 3, 1924. Serial No. 697,882.

*To all whom it may concern:*

Be it known that I, JOHN PETERSON, a citizen of the United States, and a resident of the city of New York, borough of Queens, in the county of Queens and State of New York, have invented a new and Improved Vehicle Washer, of which the following is a full, clear, and exact description.

The present invention relates to new and useful improvements in vehicle washers, and while the device is pictured in the present application as a railway car washer, it is equally as efficient for washing street cars, trucks and the like.

It is one of the objects of the present invention to provide a vehicle washer in which the vehicle may be passed between brushes for the purpose of removing the dirt from the sides and windows of a car.

It is a further object of the invention to provide means for applying water to the sides of a car to aid in the cleaning thereof.

It is a further object of the invention to construct the brushes in such a manner that they are vertically adjustable in order that different heights of cars may be effectively washed.

With the above and other objects in view, reference is had to the accompanying drawings, in which—

Figure 1 is a view in side elevation of a portion of a car showing the relative position of the apparatus with respect thereto;

Fig. 2 is a view thereof in end elevation;

Fig. 3 is a top plan view;

Fig. 4 is a detail sectional view taken on the line 4—4 of Fig. 5;

Fig. 5 is a detail horizontal sectional view taken on the line 5—5 of Fig. 4;

Fig. 6 is a detail horizontal sectional view showing the means for adjustably securing the brushes to their support;

Fig. 7 is a detail view showing the cleaning fluid control;

Fig. 8 is a view in front elevation of one of the brush elements;

Fig. 9 is a detail view showing a slightly modified form of brush.

Referring more particularly to the drawings, the reference character 10 designates a car which is supported upon a track 11. In carrying out the invention at the point along the track where the washing apparatus is positioned, the track is provided with drain pits 12. Adjacent each of the drain pits there is a base or the like, 13, and mounted in each of these bases 13 there is a vertically-extending standard 14.

It is to be understood that the mechanism heretofore described is duplicated upon opposite sides of the track, and, therefore, but one mechanism will be specifically described.

The standard 14 is provided with a plurality of guide brackets 15, and mounted in said guide brackets 15 there is a suitable supporting member 16. Depending from the supporting member 16 there is a rack 17, and such rack meshes with a gear wheel 18 carried by a shaft 19 mounted in a bracket 20, the shaft 19 being rotated by means of a handle 21 to drive the gear 18 for the purpose of raising and lowering the supporting member 16 relative to the standard 14. Mounted upon the shaft 19 there is a ratchet wheel 22, and carried by the standard 14 there is a pawl 23 adapted to engage the ratchet wheel to prevent rotation of the shaft 19 and the gear 18. This mechanism is clearly shown in Figs. 4 and 5.

The reference numeral 25 designates suitable water or other cleaning fluid supply, and at 26 such supply branches into two pipes 27 and 28 controlled by valves 29 and 30, respectively. It will be noted that these pipes extend upwardly alongside of the standard 14, and at the top of each there is connected a rubber hose or other flexible connection 31 and 32, respectively, and such flexible connections 31 and 32 are connected to perforated pipes 33 and 34, respectively.

Secured to the supporting member 16 there are two V-shaped brackets 35 and pivotally mounted on the brackets 35, by means of a shaft 36, are two V-shaped brackets 37. Pivotally mounted in these brackets 37, there is a brush member 38, and the perforated pipes 33 and 34 heretofore mentioned are secured to said brush member 38 by brackets or the like 39, said pipes having their perforations positioned upon the bristle side of the brush as clearly shown in Fig. 3. These brush members 38 are provided with handles 38' by means of which they may be manipulated when desired.

The device operates in the following manner:

As the car or vehicle to be washed is passed between the brushes, it being understood, as heretofore stated, that the mechanism is duplicated upon opposite sides of the car, water or other cleaning fluid is turned on and sprayed on to the side of the car or vehicle through the perforations of the pipes 33 and 34. The brush 38 engages the car and moves the dirt or dust therefrom which has been loosened by the spray of cleaning fluid. By operation of either of the valves 29 or 30, the cleaning fluid may be sprayed from either of the pipes 33 or 34, as desired. By operating the handle 21, which serves to rotate the shaft 19, if the pawl 23 is disengaged from the ratchet wheel 22, the support 16 may be raised or lowered to adjust the brush to the proper height, it being understood that the brush is supported from the support 16 by means of the V-shaped brackets 35 and 37 and the shaft 36.

As shown in Fig. 1, the brushes 38 are supported in such a manner as to be directly above the drain pits 12 and the water drained from the side of the car will fall into the drain pits 12 and be carried off therefrom.

In that form of the invention shown in Fig. 9, the brush comprises two sections 40 and 41 hingedly connected together, as at 32, and this construction permits of the brush conforming to the sides of a car which are not straight but which employ curves or angles as distinguished from that form of car shown in Fig. 1.

From the foregoing it is apparent that the present invention provides a new and improved vehicle washing device in which the washing of the sides of the vehicle, such as cars, trucks, and the like, may be expeditiously and effectively carried out.

What is claimed is:

1. An apparatus of the character described, comprising a standard, a support adjustably mounted on said standard, means for effecting the adjustment of said support, a bracket of pivotally connected sections one of which is pivotally connected to said support, and a brush pivotally carried by the other section of said bracket.

2. An apparatus of the character described, comprising a standard, a support adjustably mounted on said standard, means for effecting the adjustment of said support, a bracket of relatively movable sections pivotally carried by said support, and a brush of relatively adjustable sections carried by said bracket.

3. An apparatus of the character described, comprising a standard, a support adjustably mounted on said standard, crank and ratchet operable means for effecting the adjustment of said support, a bracket of pivotally connected sections one of which is pivotally connected to said support, and a brush pivotally carried by the other section of said bracket.

JOHN PETERSON.